United States Patent
Ueda et al.

(10) Patent No.: US 12,491,930 B2
(45) Date of Patent: Dec. 9, 2025

(54) VEHICLE EQUIPPED WITH STEER-BY-WIRE TYPE STEERING DEVICE

(71) Applicant: HONDA MOTOR CO., LTD., Tokyo (JP)

(72) Inventors: Yasushi Ueda, Tokyo (JP); Ryo Kato, Tokyo (JP); Yosuke Ojima, Tokyo (JP); Takashi Kuribayashi, Tokyo (JP); Takeshi Takagi, Tokyo (JP); Munetsugu Hanji, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 643 days.

(21) Appl. No.: 17/953,736

(22) Filed: Sep. 27, 2022

(65) Prior Publication Data

US 2023/0103046 A1    Mar. 30, 2023

(30) Foreign Application Priority Data

Sep. 30, 2021   (JP) .................................. 2021-161625

(51) Int. Cl.
*B62D 5/00*      (2006.01)
*B62D 6/00*      (2006.01)

(52) U.S. Cl.
CPC .............. *B62D 5/006* (2013.01); *B62D 6/00* (2013.01)

(58) Field of Classification Search
CPC .................................. B62D 5/006; B62D 6/00
See application file for complete search history.

(56) References Cited

U.S. PATENT DOCUMENTS

| | | | |
|---|---|---|---|
| 8,047,963 B2 | 11/2011 | Inoue | |
| 9,637,163 B2 | 5/2017 | Mayer | |
| 11,597,437 B2 | 3/2023 | Schäfer et al. | |

(Continued)

FOREIGN PATENT DOCUMENTS

| | | |
|---|---|---|
| CN | 101568455 A | 10/2009 |
| CN | 112046606 A | 12/2020 |

(Continued)

OTHER PUBLICATIONS

Notice of Reasons for Refusal for Japanese Patent Application No. 2021-161625 dated Jun. 4, 2024; 8 pp.

(Continued)

*Primary Examiner* — Kevin Hurley
(74) *Attorney, Agent, or Firm* — Armstrong Teasdale LLP

(57) ABSTRACT

Provided is a vehicle equipped with a steer-by-wire type steering device and designed to ensure that a wheel-turning actuator is activated before the vehicle starts traveling, thereby improving the reliability of steering while the vehicle is traveling. A vehicle 1 includes: a steering member 15 for receiving steering operations; a wheel-turning actuator 19 mechanically separated from the steering member 15 and configured to turn wheels; a state switching device 6 for switching between a fixed state in which the vehicle is fixed at a current position and a release state in which the vehicle is released from being fixed at the current position; and a control device 9 for controlling the wheel-turning actuator 19 and the state switching device 6, wherein the control device permits the state switching device to switch from the fixed state to the release state only on or after completion of activation of the wheel-turning actuator.

9 Claims, 6 Drawing Sheets

(56) References Cited

U.S. PATENT DOCUMENTS

| | | | |
|---|---|---|---|
| 12,221,173 | B2 | 2/2025 | Sakayori et al. |
| 2022/0258794 | A1 | 8/2022 | Takesaki et al. |

FOREIGN PATENT DOCUMENTS

| | | | | |
|---|---|---|---|---|
| CN | 114340977 A | | 4/2022 | |
| DE | 10217717 A1 | * | 7/2003 | ............... B62D 9/00 |
| GB | 2583967 A | * | 11/2020 | ............. B62D 5/006 |
| JP | H10211885 A | | 8/1998 | |
| JP | 2000280926 A | | 10/2000 | |
| JP | 2004100813 A | | 4/2004 | |
| JP | 2007261299 A | | 10/2007 | |
| JP | 2008290562 A | | 12/2008 | |
| JP | 2021054337 A | | 4/2021 | |
| JP | 2021075182 A | | 5/2021 | |
| KR | 20250026282 A | * | 2/2025 | ............. B62D 5/006 |

OTHER PUBLICATIONS

First Office Action for Chinese Patent Application No. 202211180252.8 dated Jun. 24, 2025; 13 pp.

\* cited by examiner

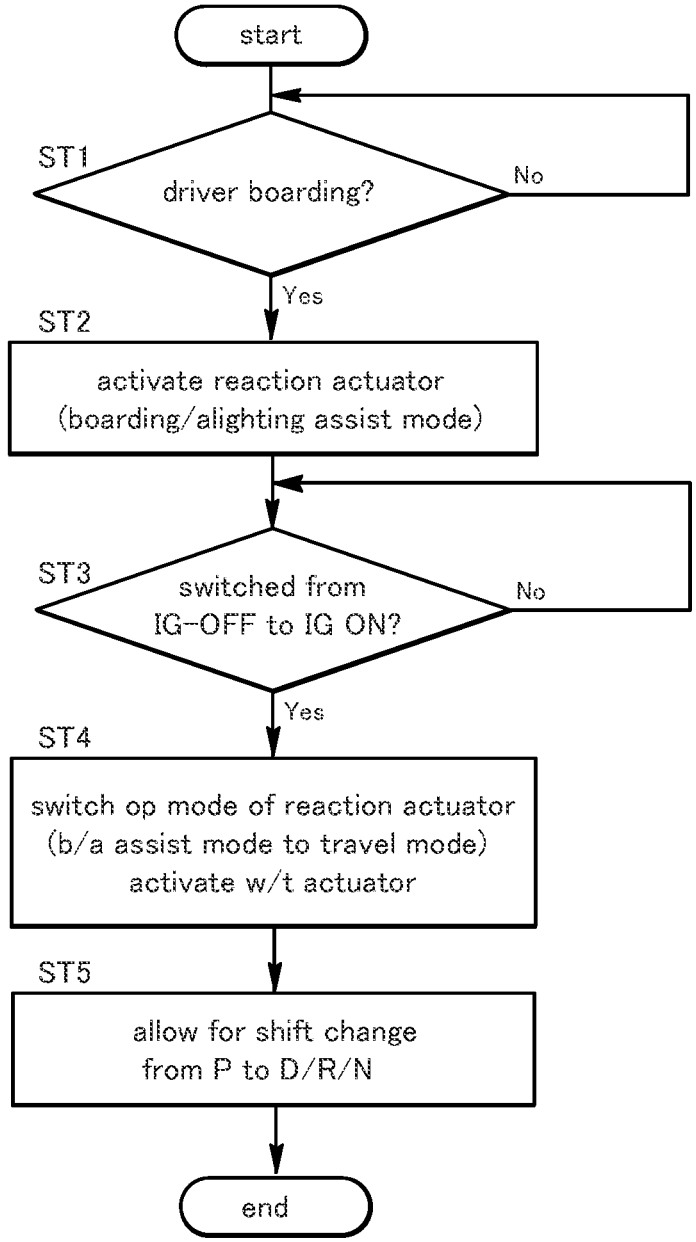

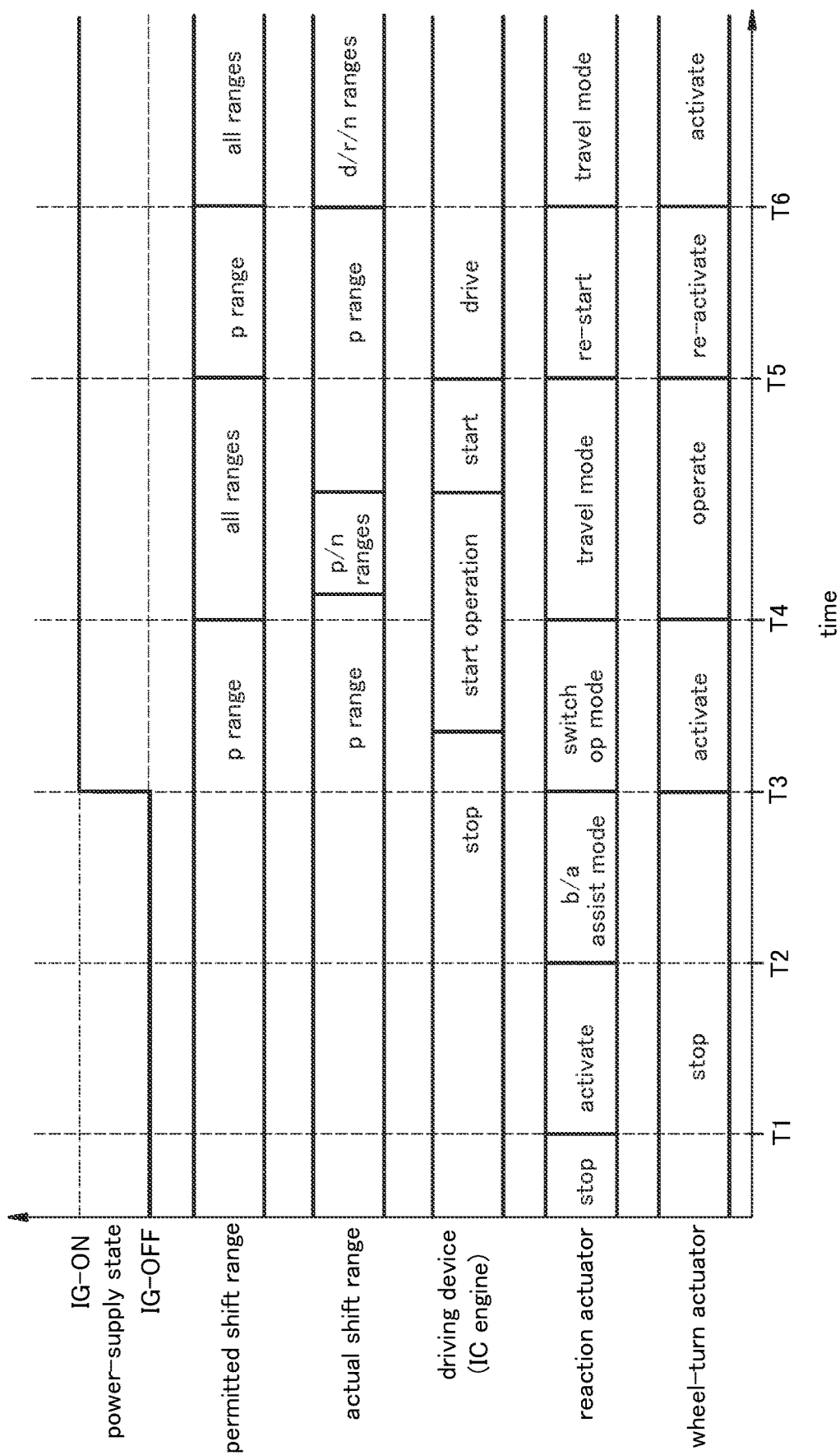

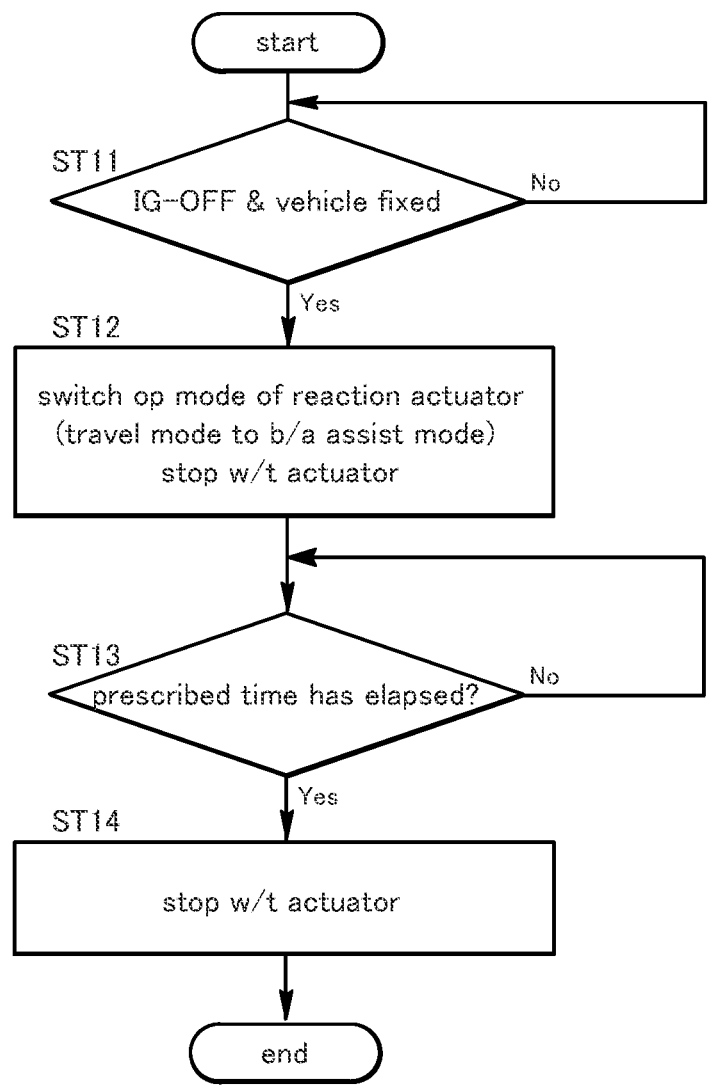

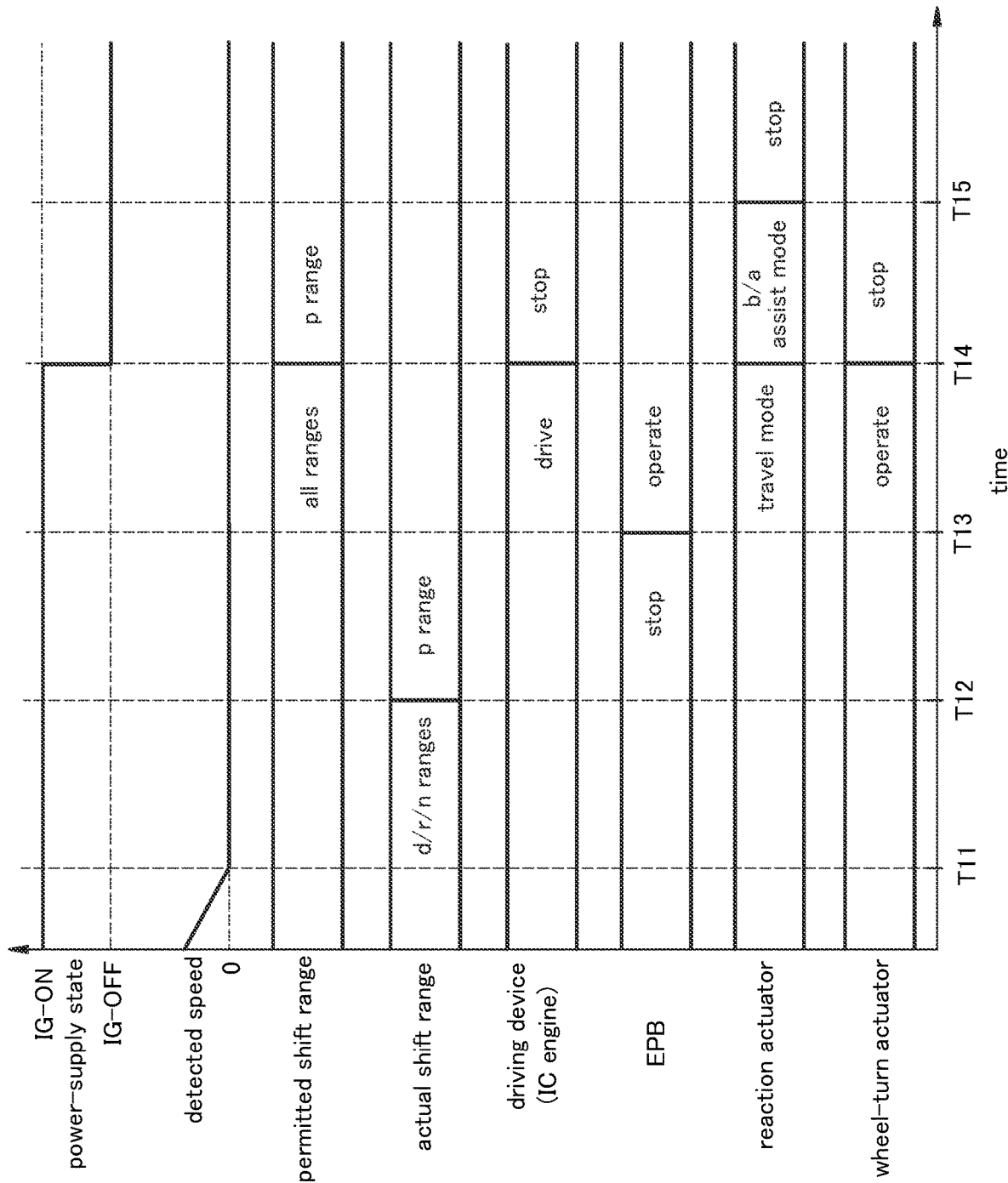

VEHICLE EQUIPPED WITH STEER-BY-WIRE TYPE STEERING DEVICE

TECHNICAL FIELD

The present invention relates to a vehicle equipped with a steer-by-wire type steering device.

BACKGROUND ART

Known steering devices include a steer-by-wire type steering device, which generally comprises a steering member for receiving steering operations, and a wheel-turning actuator mechanically separated from the steering member and configured to turn wheels for change in a moving direction of a vehicle.

For example, Patent Document 1 teaches a steer-by-wire system for a vehicle in which a steering mechanism is mechanically separated from a wheel-turning mechanism.

PRIOR ART DOCUMENT (S)

Patent Document(s)

Patent Document 1: JP2021-075182A

SUMMARY OF THE INVENTION

Task to be Accomplished by the Invention

In the case of a vehicle provided with the above-described steer-by-wire system, there is a need to ensure that a wheel-turning actuator is activated before a vehicle starts traveling, in order to improve the reliability of steering while the vehicle is traveling.

The present invention has been made in view of the need for the prior art, and a primary object of the present invention is to provide a vehicle equipped with a steer-by-wire type steering device and designed to ensure that a wheel-turning actuator is activated before the vehicle starts traveling, thereby improving the reliability of steering while the vehicle is traveling.

Means to Accomplish the Task

An aspect of the present invention that achieves the above-described object is a vehicle (1), comprising: a steering member (15) for receiving steering operations; a wheel-turning actuator (19) mechanically separated from the steering member and configured to turn wheels (30) for change in a moving direction of the vehicle; a state switching device (6) for switching between a fixed state in which the vehicle is fixed at a current position and a release state in which the vehicle is released from being fixed at the current position; and a control device (9) for controlling the wheel-turning actuator and the state switching device, wherein the control device permits the state switching device to switch from the fixed state to the release state only on or after completion of an operation for activating the wheel-turning actuator (steps ST4, ST5).

According to this configuration, the vehicle is released from being fixed at a current position so that the vehicle can travel, only on or after completion of an operation for activating the wheel-turning actuator. This ensures that the wheel-turning actuator is activated before the vehicle starts traveling, thereby improving the reliability of steering while the vehicle is traveling.

The above vehicle may be further configured such that the vehicle has a power supply state which can be switched between a first power supply state in which the vehicle is prevented from traveling and a second power supply state in which the vehicle is permitted to travel, and wherein the control device is configured such that, when the power supply state of the vehicle is the first power supply state and the wheel-turning actuator stops operating, the control device determines whether or not the power supply state of the vehicle has switched from the first power supply state to the second power supply state (step ST3), and that, when determining that the power supply state of the vehicle has switched from the first power supply state to the second power supply state (step ST3: Yes), the control device starts the operation for activating the wheel-turning actuator (step ST4).

In this configuration, upon the change of the power supply state of the vehicle from the first power supply state to the second power supply state, the control device can quickly start activating the wheel-turning actuator. As a result, it is possible to shorten waiting time for an occupant of the vehicle before the completion of the operation for activating the wheel-turning actuator.

The above vehicle may be further configured such that the vehicle has a power supply state which can be switched between a first power supply state in which the vehicle is prevented from traveling and a second power supply state in which the vehicle is permitted to travel, and wherein the control device is configured such that, when the wheel-turning actuator is operating, the control device determines whether or not the power supply state of the vehicle is the first power supply state and the vehicle is fixed at the current position (step ST11), and that, when determining that the power supply state of the vehicle is the first power supply state and the vehicle is fixed at the current position (step ST11: Yes), the control device stops the wheel-turning actuator (step ST12).

In this configuration, the control device can stop the wheel-turning actuator only after confirming that the vehicle is at a complete stop. As a result, it is possible to further improve the reliability of steering while the vehicle is traveling.

The above vehicle may be further configured such that the vehicle further comprises: a vehicle speed sensor (41) for detecting a vehicle speed of the vehicle; and an electric parking brake (13) for fixing the vehicle at the current position, wherein the state switching device is a shift device configured to switch a shift range between a fixed range for fixing the vehicle at the current position and a release range for releasing the vehicle from being fixed at the current position, and wherein the control device determines that the vehicle is fixed at the current position when at least one of two conditions is met, the two conditions consisting of a first condition in which the vehicle speed detected by the vehicle speed sensor is zero and the shift range is the fixed range, and a second condition in which the vehicle speed detected by the vehicle speed sensor is zero and the electric parking brake is operating.

In this configuration, the control device can accurately determine whether or not the vehicle is fixed at the current position. As a result, it is possible to further improve the reliability of steering while the vehicle is traveling.

The above vehicle may be further configured such that the vehicle further comprises: a reaction actuator (16) for applying a reaction force to the steering member, the reaction force being responsive to a steering operation received by the steering member, wherein the control device switches an operation mode of the reaction actuator between a travel mode for driving the vehicle and a boarding/alighting assist mode for assisting a driver in getting on and out of the vehicle.

In this configuration, it is possible to apply reaction forces to the steering member, not only while the vehicle is traveling but also when a driver is getting on and out of the vehicle. As a result, the steering member does not tend to move even when a driver touches the steering member to get on and out of the vehicle, and thus it becomes easier for the driver to get on and out of the vehicle.

The above vehicle may be further configured such that the vehicle has a power supply state which can be switched between a first power supply state in which the vehicle is prevented from traveling and a second power supply state in which the vehicle is permitted to travel, and wherein the control device is configured such that, when the power supply state of the vehicle is the first power supply state and both the wheel-turning actuator and the reaction actuator stop operating, the control device determines whether or not a driver is getting on the vehicle (step ST1), and when determining that the driver is getting on the vehicle (step ST1: Yes), the control device activates the reaction actuator so that the reaction actuator operates in the boarding/alighting assist mode, while stopping the wheel-turning actuator (step ST2).

In this configuration, it is possible to apply reaction forces to the steering member when a driver is getting on the vehicle. As a result, the steering member does not tend to move even when a driver touches the steering member to get on the vehicle, and thus it becomes easier for the driver to get on the vehicle. In addition, as the control device activates the reaction actuator while stopping the wheel-turning actuator, it is possible to reduce wasteful power consumption.

The above vehicle may be further configured such that the control device is configured such that, when the power supply state of the vehicle is the first power supply state and the reaction actuator is operating in the boarding/alighting assist mode, the control device determines whether or not the power supply state of the vehicle has been switched from the first power supply state to the second power supply state (step ST3), and that, when determining that the power supply state of the vehicle has been switched from the first power supply state to the second power supply state (step ST3: Yes), the control device switches the operation mode of the reaction actuator from the boarding/alighting assist mode to the travel mode (step ST4).

In this configuration, in response to the change of the power supply state of the vehicle from the first power supply state to the second power supply state, the operation mode of the reaction actuator can be quickly switched from the boarding/alighting assist mode to the travel mode. As a result, it is possible to shorten waiting time for an occupant of the vehicle before completion of the switch of the operation mode.

The above vehicle may be further configured such that the vehicle has a power supply state which can be switched between a first power supply state in which the vehicle is prevented from traveling and a second power supply state in which the vehicle is permitted to travel, and wherein the control device is configured such that, when the operation mode of the reaction actuator is the travel mode, the control device determines whether or not the power supply state of the vehicle is the first power supply state and the vehicle is fixed at the current position (step ST11), and that, when determining that the power supply state of the vehicle is the first power supply state and the vehicle is fixed at the current position (step ST11: Yes), the control device switches the operation mode of the reaction actuator from the travel mode to the boarding/alighting assist mode (step ST12).

In this configuration, when the vehicle stops traveling, the control device keeps the reaction actuator operating so that the reaction actuator continues to apply reaction forces to the steering member. As a result, the steering member does not tend to move even when a driver touches the steering member to get out of the vehicle, and thus it becomes easier for the driver to get out of the vehicle.

The above vehicle may be further configured such that, when the operation mode of the reaction actuator is the boarding/alighting assist mode, the control device gradually changes the reaction force applied by the reaction actuator to the steering member.

In this configuration, it is possible to suppress a rapid change in the reaction force applied to the steering member caused by the change of the operation mode of the reaction actuator, thereby reducing an uncomfortable feeling for a driver.

The above vehicle may be further configured such that, when a predetermined time has elapsed since the operation mode of the reaction actuator became the boarding/alighting assist mode (step ST13: Yes), the control device stops the reaction actuator (step ST14).

In this configuration, as the reaction actuator is prevented from continuously operating for a long time, it is possible to reduce wasteful power consumption.

Effect of the Invention

According to the present invention, a vehicle equipped with a steer-by-wire type steering device can be configured to ensure that a wheel-turning actuator is activated before the vehicle starts traveling, thereby improving the reliability of steering while the vehicle is traveling.

BRIEF DESCRIPTION OF THE DRAWINGS

FIG. 3 is a flowchart showing a travel start control operation according to the embodiment of the present invention;

FIG. 4 is a timing diagram showing the travel start control operation according to the embodiment of the present invention;

FIG. 5 is a flowchart showing a travel end control operation according to the embodiment of the present invention; and FIG. 6 is a timing diagram showing the travel end control operation according to the embodiment of the present invention.

DESCRIPTION OF THE PREFERRED EMBODIMENT(S)

<Vehicle 1>

Figure 1:
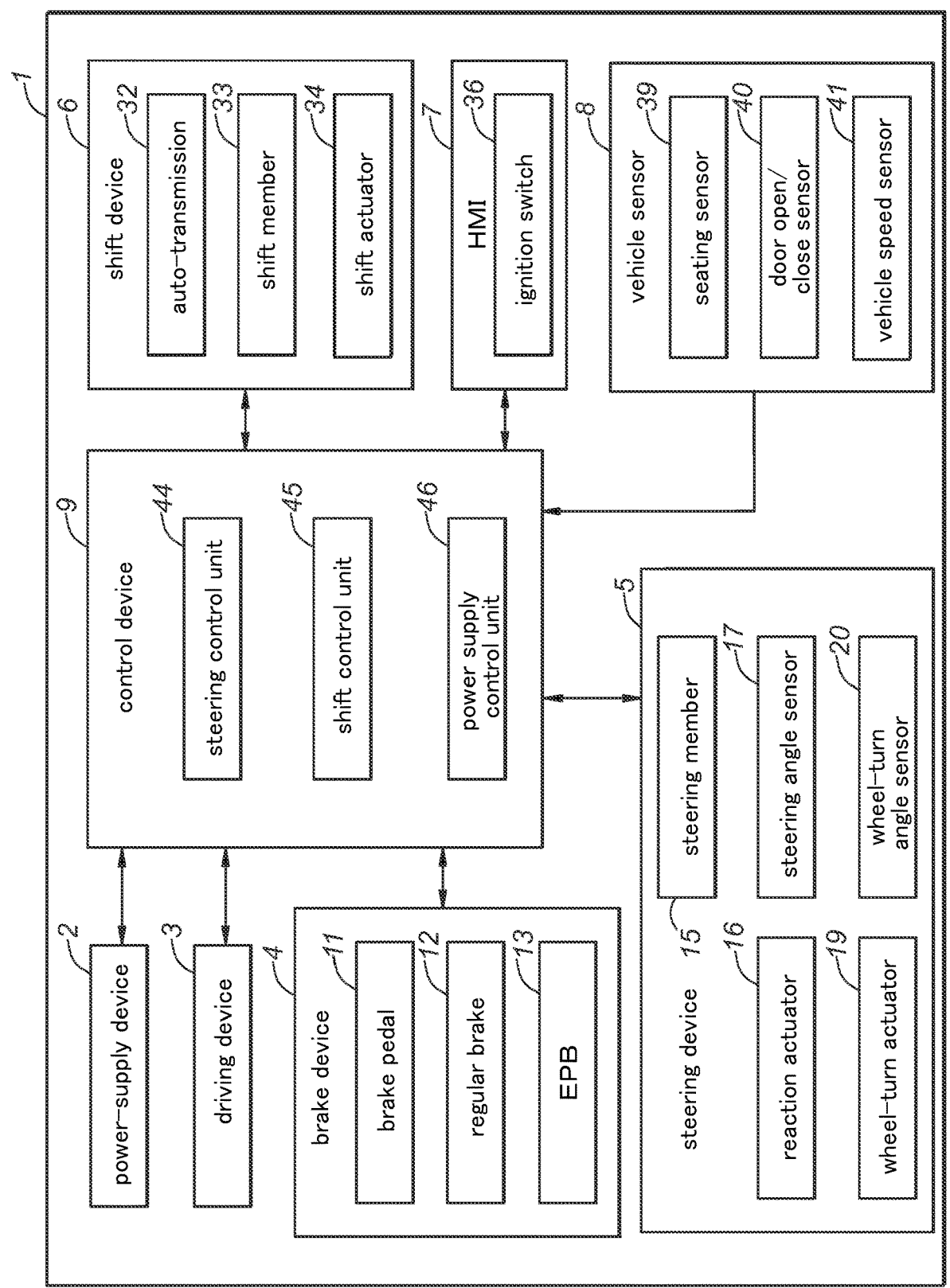
FIG. 1 is a block diagram showing a vehicle according to an embodiment of the present invention.

A vehicle 1 according to one embodiment of the present invention will be described. The vehicle 1 is, for example, a four-wheeled vehicle. Referring to FIG. 1, the vehicle 1 includes a power-supply device 2, a driving device 3, a brake device 4, a steering device 5, a shift device 6 (an example of a state switching device), an HMI (Human Machine Interface) 7, a vehicle sensor 8, and a control device 9.

<Power-Supply Device 2>

The power-supply device 2 is a device for supplying electric power to components of the vehicle 1. The power-supply device 2 is comprised primarily of a plurality of batteries and a generator. Hereinafter, a state of power supply from the power-supply device 2 is referred to as a "power supply state of the vehicle 1."

<Driving Device 3>

The driving device 3 provides the vehicle 1 with a driving force for the vehicle 1 to travel. In the present embodiment, the driving device 3 is comprised primarily of an internal combustion engine. In other embodiments, the driving device 3 may be comprised primarily of an internal combustion engine and an electric motor, or may be comprised primarily of an electric motor.

<Brake Device 4>

The brake device 4 includes a brake pedal 11, a regular brake 12, and an electric parking brake 13 (hereinafter referred to as "EPB 13"). The brake pedal 11 receives a driver's braking operation. The regular brake 12 applies a braking force to the vehicle 1 in response to a braking operation on the brake pedal 11. The regular brake 12 may be a hydraulic brake. The EPB 13 fixes the vehicle 1 at a current position in response to a signal from the control device 9. The EPB 13 includes, for example, an actuator comprised primarily of an electric motor, a brake mechanism provided on a rear wheel(s), and a deceleration mechanism which connects the actuator to the brake mechanism.

<Steering Device 5>

Figure 2:
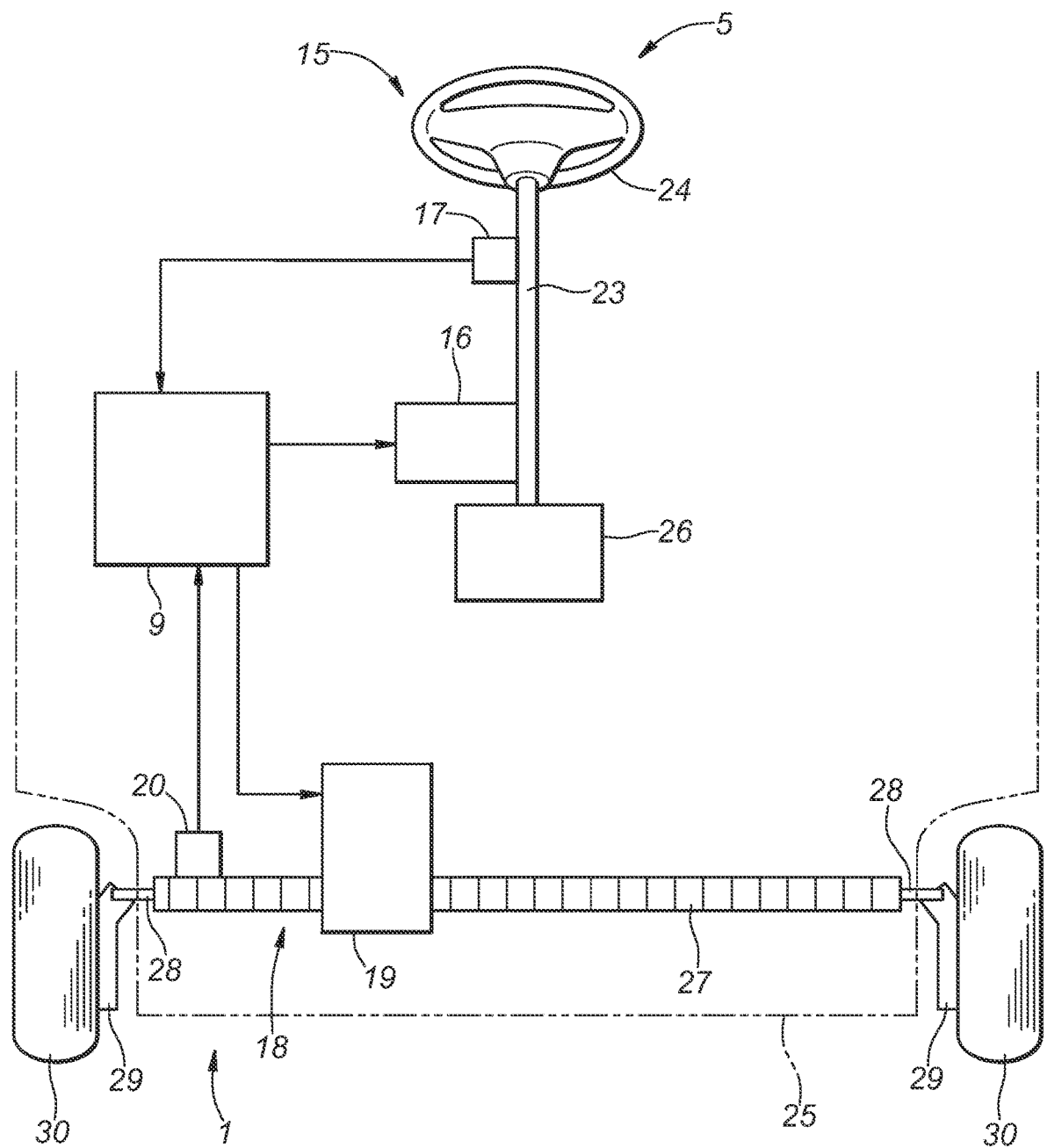
FIG. 2 is a schematic view showing a steering device and a steering control unit according to the embodiment of the present invention.

Referring to FIG. 2, the steering device 5 includes a steering member 15, a reaction actuator 16, a steering angle sensor 17, a wheel-turning mechanism 18, a wheel-turning actuator 19, and a wheel-turning angle sensor 20. The steering device 5 is a steer-by-wire type steering device, in which the steering member 15 and the wheel-turning actuator 19 are separated from each other.

The steering member 15 receives a driver's steering operation. The steering member 15 includes, for example, a steering shaft 23 and a steering wheel 24 provided at one end of the steering shaft 23. The steering shaft 23 is rotatably supported by a steering column 26 provided on the vehicle body 25, and has a rear end that protrudes rearward from the steering column 26. The steering wheel 24 is coupled to the rear end of the steering shaft 23 and rotates integrally with the steering shaft 23.

The reaction actuator 16 is comprised primarily of an electric motor and is connected to the steering shaft 23 via a gear mechanism (not shown). The reaction actuator 16 applies a reaction force torque to the steering member 15 according to a signal from the control device 9, the reaction force torque being responsive to a steering operation received by the steering member 15. In the present specification, operation states of the reaction actuator 16 include not only a state in which the reaction actuator 16 actually applies a reaction force torque to the steering member 15, but also a state in which the reaction actuator 16 is controlled by the control device 9 so that the reaction force torque can be applied to the steering member 15.

The steering angle sensor 17 detects steering angles of the steering member 15 (rotational angles of the steering member 15 with respect to a predetermined neutral angular position). The steering angle sensor 17 is comprised primarily of, for example, an absolute angle sensor.

The wheel-turning mechanism 18 has a rack 27 extending in the vehicle width direction. The rack 27 has left and right ends that are connected to left and right knuckles 29 via left and right tie rods 28, respectively. The left and right knuckles 29 support the left and right front wheels 30, respectively.

The wheel-turning actuator 19 is comprised primarily of an electric motor and is connected to the rack 27 of the wheel-turning mechanism 18. The wheel-turning actuator 19 steers the front wheels 30 by moving the rack 27 in the vehicle width direction according to a signal from the control device 9. In the present specification, operation states of the wheel-turning actuator 19 include not only a state in which the wheel-turning actuator 19 is actually moving the rack 27, but also a state in which the wheel-turning actuator 19 is controlled by the control device 9 so that the wheel-turning actuator 19 can move the rack 27.

The wheel-turning angle sensor 20 is comprised primarily of a rack stroke sensor configured to detect positions of the rack 27 in the vehicle width direction. The wheel-turning angle sensor 20 detects wheel-turning angles of the front wheel 30 based on the position of the rack 27 in the vehicle width direction.

<Shift Device 6>

Referring to FIG. 1, the shift device 6 includes an automatic transmission 32, a shift member 33, and a shift actuator 34. The shift device 6 is a shift-by-wire type shift device, in which the shift member 33 and the shift actuator 34 are mechanically separated from each other.

The automatic transmission 32 is provided in a drive transmission path from the driving device 3 to the wheels (driving wheels), and shifts into difference gears to change the driving force transmitted from the driving device 3 to the wheels. The automatic transmission 32 selects one of (switches between) shift ranges set by different gears (hereinafter, simply referred to as "shift range"), which include a P range (park range), a D range (drive range), an R range (reverse range), and an N range (neutral range). The P range is a shift range in which the wheels are locked from rotating and no driving force is transmitted from the driving device 3 to the wheels. The D range is a shift range in which the driving force is transmitted from the driving device 3 to the wheels such that the vehicle 1 moves frontward. The R range is a shift range in which the driving force is transmitted from the driving device 3 to the wheels such that the vehicle 1 moves backward. The N range is a shift range in which the wheels are allowed to rotate, but no driving force of is transmitted from the driving device 3 to the wheels. The P range is a "fixed range" in which the vehicle 1 is fixed to a current position, and when the shift range is the P range, the vehicle is in a "fixed state" in which the vehicle 1 is fixed to a current position. Each of the D range, R range, and N range is a "release range" in which the vehicle 1 is released from being fixed at a current position so that the vehicle 1 can move, and when the shift range is any of the D range, R range, and N range, the vehicle is in a "release state" in which the vehicle 1 is released from being fixed to a current position.

The shift member 33 receives a driver's shift range switching operation. The shift member 33 may include a shift lever and a shift switch.

The shift actuator 34 is comprised primarily of an electric motor, and is connected to the automatic transmission 32. The shift actuator 34 operates in response to a signal from the control device 9 and switches the shift range between the P range, D range, R range, and N range.

<HMI 7>

The HMI 7 is configured to notify an occupant(s) of various types of information and receives various operations performed by the occupant(s). The HMI 7 may include an ignition switch 36 (an example of a power switch) configured to receive a switching operation for switching the power supply states of the vehicle 1.

<Vehicle Sensor 8>

The vehicle sensor 8 detects various states of the vehicle 1 and provides detection results to the control device 9. The vehicle sensor 8 may include a seating sensor 39 for detecting the seating of an occupant on each seat of the vehicle 1, a door opening/closing sensor 40 for detecting the opening/closing of each door of the vehicle 1, a vehicle speed sensor 41 for detecting vehicle speeds, and other types of sensors. Hereinafter, the vehicle speed detected by the vehicle speed sensor 41 is referred to as "detected vehicle speed."

<Control Device 9>

The control device 9 includes an arithmetic processing device (processor such as CPU or MPU) and a storage device (memory such as ROM or RAM). The control device 9 is an electronic control device (ECU) comprised primarily of a computer configured to execute various processing operations as a travel start control operation and a travel end control operation described later. The arithmetic processing device (processor), a main part of the control device 9, is programmed to read necessary data and application software from the storage device (memory) and execute predetermined arithmetic processing operations according to the application software. The control device 9 may be configured as a single piece of hardware or a unit module including a plurality of pieces of hardware. The control device 9 is connected to each structural and/or functional component of the vehicle 1 by a communication network such as CAN (Control Area Network), and controls each component of the vehicle 1.

The control device 9 includes a steering control unit 44, a shift control unit 45, and a power supply control unit 46 as functional units. At least part of each functional unit of the control device 9 may be implemented by hardware such as LSI, ASIC, FPGA, or a combination of software and hardware.

The steering control unit 44 controls the steering device 5. Specifically, the steering control unit 44 controls the wheel-turning actuator 19 and the reaction actuator 16 based on detection results of the steering angle sensor 17 and the wheel-turning angle sensor 20. In some cases, the steering control unit 44 may determine a target wheel-turning angle and drive the wheel-turning actuator 19 such that the wheel-turning angle detected by the wheel-turning angle sensor 20 matches the target wheel-turning angle, based on the steering angle detected by the steering angle sensor 17. The steering control unit 44 may determine a target torque based on the difference between a wheel-turning angle detected by the wheel-turning angle sensor 20 and the target wheel-turning angle, and drive the reaction actuator 16 such that a reaction force torque applied by the reaction actuator 16 to the steering member 15 matches the target torque.

The steering control unit 44 switches the operation mode of the reaction actuator 16 between a travel mode for driving the vehicle 1 and a boarding/alighting assist mode for assisting a driver in getting on and out of the vehicle 1. In the travel mode, the reaction force torque is determined based on traveling states of the vehicle 1 (such as, a steering state of the wheels, a yaw rate, a lateral acceleration), and thus the vehicle 1 is allowed to travel in a normal way. In the boarding/alighting assist mode, the reaction force torque is determined regardless of the traveling states of the vehicle 1, and thus the vehicle 1 is not allowed to travel in a normal way.

The shift control unit 45 controls the shift device 6. Specifically, the shift control unit 45 controls the shift actuator 34 based on the driver's shift range switching operation on the shift member 33. In other words, the shift control unit 45 causes the shift actuator 34 to switch the shift range according to the driver's shift range switching operation on the shift member 33.

The power supply control unit 46 switches the power supply state of the vehicle 1 between a first power supply state and a second power supply state according to a driver's switching operation on the ignition switch 36. In the present embodiment, the first power supply state is an ignition off state (IG-OFF state), and the second power supply state is an ignition on state (IG-ON state). In the IG-OFF state, the electric power for driving the vehicle 1 is not supplied from the power-supply device 2 to the driving device 3, so that the vehicle 1 is not allowed to travel. In the IG-ON state, the electric power for driving the vehicle 1 is supplied from the power-supply device 2 to the driving device 3, so that the vehicle 1 is allowed to travel.

<Travel Start Control Operation>

Next, a travel start control operation (control operations executed at the start of traveling of the vehicle 1) executed by the control device 9 will be described with reference to FIG. 3. In the following description, it is assumed that the power supply state of the vehicle 1 is the IG-OFF state and the reaction actuator 16 and the wheel-turning actuator 19 are stopped at the start of the travel start control operation. It is also assumed that the shift control unit 45 controls the shift actuator such that the shift range is fixed to the P range; that is, the shift control unit 45 prohibits the shift actuator 34 from switching the shift range from the P range to any one of the D range, the R range, and the N range at this time at the start of the travel start control operation.

When the control device 9 starts the travel start control operation, the steering control unit 44 determines whether or not the driver is getting on the vehicle 1 based on a detection result of the vehicle sensor 8 (step ST1). For example, when the seating sensor 39 does not detect the seating of an occupant in the driver's seat and the door opening/closing sensor 40 detects the opening of the door on the side of the driver's seat, the steering control unit 44 determines that the driver 1 is getting on the vehicle 1. When the seating sensor 39 detects the seating of an occupant in the driver's seat, or when the door open/close sensor 40 does not detect the opening of the door on the side of the driver's seat, the steering control unit 44 determines that the driver 1 is not getting on the vehicle 1. When the steering control unit 44 determines that the driver 1 is not getting on the vehicle 1 (step ST1: No), the steering control unit 44 repeats the determination operation of step ST1 until a determination result is Yes.

When the steering control unit 44 determines that the driver 1 is getting on the vehicle 1 (step ST1: Yes), the steering control unit 44 performs an activation operation on the reaction actuator 16 (i.e., an operation for activating the reaction actuator 16) while stopping the wheel-turning actuator 19, to thereby activate the reaction actuator 16 in a boarding/alighting assist mode (step ST2). As a result, the reaction actuator 16 applies reaction force torque to the steering member 15.

Next, the steering control unit 44 determines whether or not the power supply state of the vehicle 1 has been switched from the IG-OFF state to the IG-ON state (step ST3). When determining that the power supply state of the vehicle 1 has not been switched from the IG-OFF state to the IG-ON state (step ST3: No), the steering control unit 44 repeats the determination operation of step ST3 until a determination result is Yes.

When determining that the power supply state of the vehicle 1 has been switched from the IG-OFF state to the IG-ON state (step ST3: Yes), the steering control unit 44 performs an mode change operation on the reaction actuator 16 (i.e., an operation for changing the operation mode of the reaction actuator 16) to switch the operation mode from the boarding/alighting assist mode to the travel mode. Furthermore, the steering control unit 44 performs an activation operation on the wheel-turning actuator 19 (i.e., an operation for activating the wheel-turning actuator 19) to activate the wheel-turning actuator 19 (step ST4).

In step ST4, upon the completion of the mode change operation on the reaction actuator 16 and the activation operation on the wheel-turning actuator 19, the shift control unit 45 releases the shift range from being fixed to the P range. In other words, the shift control unit 45 allows the shift actuator 34 to switch the shift range from the P range to any of the D range, the R range, and the N range (step ST5). As a result, the vehicle 1 can travel, and the control device 9 ends the travel start control operation of the vehicle 1.

Next, the following description with reference to FIG. 4 is about examples of operations of the components of the vehicle 1 at the time when the control device 9 executes the above-described travel start control operation. In FIG. 4, the term "permitted shift range" refers to shift ranges which the shift control unit 45 is permitted to select, and the term "actual shift range" refers to the shift range that the shift control unit 45 has actually selected.

At time T1, the steering control unit 44 determines that a driver is getting on the vehicle 1. In response to the determination, the steering control unit 44 starts an activation operation on the reaction actuator (i.e., an operation for activating the reaction actuator 16) while stopping the wheel-turning actuator 19. At time T2, the activation operation on the reaction actuator is completed. In response to the completion of the activation operation, the steering control unit 44 activates the reaction actuator 16 so that the reaction actuator 16 operates in the boarding/alighting assist mode.

At time T3, in response to the switching operation on the ignition switch 36, the power supply control unit 46 switches the power supply state of the vehicle 1 from the IG-OFF state to the IG-ON state. In response the switching of the power supply state, the steering control unit 44 starts a mode change operation for switching the operation mode of the reaction actuator 16 from the boarding/alighting assist mode to the travel mode, and also the activation operation on the wheel-turning actuator 19.

At time T4, both the mode change operation on the reaction actuator 16 and the activation operation on the wheel-turning actuator 19 are completed. In response to the completion of the operations, the shift control unit 45 releases the shift range from being fixed to the P range. In other words, the shift control unit 45 allows the shift actuator 34 to switch the shift range from the P range to any of the D range, the R range, and the N range.

In the example of FIG. 4, the mode change operation on the reaction actuator 16 and the activation operation on the wheel-turning actuator 19 are completed at the same time at time T4. However, in other cases, the mode change operation on the reaction actuator 16 and the activation operation on the wheel-turning actuator 19 may be completed at different times. In such a case, one of the mode change operation on the reaction actuator 16 and the activation operation on the wheel-turning actuator 19 is completed earlier than the other, and upon the completion of the operation that is completed later, the shift control unit 45 may release the shift range from being fixed to the P range.

After both the mode change operation on the reaction actuator 16 and the activation operation on the wheel-turning actuator 19 are completed, at time T4, the control device 9 performs a start operation on the internal combustion engine forming the driving device 3 (an operation of starting the internal combustion engine). As a result, in some cases, the voltage of the power-supply device 2 drops due to cranking, resulting in that the reaction actuator 16 and the wheel-turning actuator 19 are reset at time T5. In this case, the steering control unit 44 needs to perform restart operations on the reaction actuator 16 and the wheel-turning actuator 19. During the restart operations on the reaction actuator 16 and the wheel-turning actuator 19, the shift control unit 45 fixes the shift range to the P range again.

At time T6, the restarted operations on the reaction actuator 16 and the wheel-turning actuator 19 are completed. In response to the completion, the shift control unit 45 releases the shift range from being fixed to the P range again.

<Travel End Control Operation>

Next, a travel end control operation (control operations executed at the end of traveling of the vehicle 1) executed by the control device 9 will be described with reference to FIG. 5. In the following description, it is assumed that the power supply state of the vehicle 1 is the IG-OFF state, that the reaction actuator 16 is operating in the travel mode, and that the wheel-turning actuator 19 is operating at the start of the travel end control operation. It is also assumed that the shift control unit 45 has released the shift range from being fixed to the P range; that is, the shift control unit 45 allows the shift actuator 34 to switch the shift range from the P range to any one of the D range, the R range, and the N range at the start of the travel end control operation.

When the travel end control operation starts, the steering control unit 44 determines whether or not the power supply state of the vehicle 1 is the IG-OFF state and the vehicle 1 fixed at the current position (step ST11). When determining that at least one of the following first condition and second condition is met, the steering control unit 44 determines that the vehicle 1 is fixed at the current position. When determining that neither of the first and second conditions is met, the steering control unit 44 determines that the vehicle 1 is not fixed at the current position.

<First Condition>

The detected vehicle speed is zero, and the shift range is in the P range.

<Second Condition>

The detected vehicle speed is zero, and the EPB13 is operating.

When determining that the power supply state of the vehicle 1 is not the IG-OFF state or that the vehicle 1 is not fixed (step ST11: No), the steering control unit 44 repeats the determination operation of step ST11 until a determination result of ST11 is Yes.

When determining that the power supply state of the vehicle 1 is the IG-OFF state and the vehicle 1 is fixed at the current position (step ST11: Yes), the steering control unit 44 performs the mode change operation on the reaction actuator 16 to thereby switch the operation mode of the reaction actuator 16 from the travel mode to the boarding/alighting assist mode. In addition, the steering control unit 44 stops the wheel-turning actuator 19 (step ST12). After switching the operation mode of the reaction actuator 16 from the travel mode to the boarding/alighting assist mode as described above, the steering control unit 44 gradually changes the reaction force torque applied by the reaction actuator 16 to the steering member 15.

Next, the steering control unit 44 determines whether or not a predetermined time has elapsed since the operation mode of the reaction actuator 16 was switched from the travel mode to the boarding/alighting assist mode (step ST13). When determining that the predetermined time has not elapsed (step ST13: No), the steering control unit 44 repeats the determination operation of step ST13 until a determination result of step ST13 is Yes.

When determining that the predetermined time has elapsed (step ST13: Yes), the steering control unit 44 stops the reaction actuator 16 (step ST14). Then, the travel end control operation of the vehicle 1 is completed.

Next, the following description with reference to FIG. 6 is about examples of operations of the components of the vehicle 1 at the time when the control device 9 executes the travel end control operation. In FIG. 6, the term "permitted shift range" refers to shift ranges which the shift control unit 45 is permitted to select, and the term "actual shift range" refers to the shift range that the shift control unit 45 has actually selected.

The vehicle 1 starts decelerating in order to end the traveling of the vehicle 1. Then, the detected vehicle speed becomes zero at the time T11. At time T12, the shift actuator 34 switches the shift range from the D range, the R range, or the N range to the P range according to the shift range switching operation on the shift member 33. As a result, the first condition is met, and the steering control unit 44 determines that the vehicle 1 is fixed at the current position. However, at time T12, since the power supply state of the vehicle 1 is the IG-ON state, the steering control unit 44 does not switch the operation mode of the reaction actuator 16 and does not stop the wheel-turning actuator 19.

At time T13, the EPB13 start operating. As a result, the second condition is also met, and the steering control unit 44 determines that the vehicle 1 is fixed at the current position. However, at time T13, since the power supply state of the vehicle 1 is the IG-ON state, the steering control unit 44 does not switch the operation mode of the reaction actuator 16 and does not stop the wheel-turning actuator 19.

At time T14, in response to a driver's switching operation on the ignition switch 36, the power supply control unit 46 switches the power supply state of the vehicle 1 from the IG-ON state to the IG-OFF state. At time T14, since the first condition and second condition are still met, the steering control unit 44 determines that the power supply state of the vehicle 1 is the IG-OFF state and the vehicle 1 is fixed at the current position. In response the switch of the power supply state, the steering control unit 44 starts a mode change operation for switching the operation mode of the reaction actuator 16 from the travel mode to the boarding/alighting assist mode, and also the activation operation on the wheel-turning actuator 19.

At time T15, a predetermined time has elapsed from time T14, and the steering control unit 44 stops the reaction actuator 16.

In some cases, the power of the EPB 13 may be turned on while the vehicle 1 is traveling (the vehicle speed is not zero). In such a case, the control device 9 may decelerate the vehicle 1 by using the regular brake 12 while keeping the power of the EPB 13 turned on, and start operating the EPB 13 in response to the detection of complete stop of the vehicle. As a result, the second condition can be met when the vehicle 1 stops.

In some cases, when the vehicle 1 stops (the detected vehicle speed is zero) and the shift range is in the D range, R range, or N range, the power supply state of the vehicle 1 may change from the IG-ON state to the IG-OFF state. In such a case, the shift control unit 45 may automatically switch the shift range from the D range, the R range, or the N range to the P range according to the change in the power supply state. As a result, the first condition is met when the power supply state is switched.

In some cases, the ignition switch 36 is operated to be switched from the IG-ON state to the IG-OFF state while the vehicle 1 is traveling (the vehicle speed is not zero). In such a case, the shift control unit 45 may automatically switch the shift range from the D range, the R range, or the N range to the P range in response to the detection of complete stop of the vehicle. As a result, the first condition can be met when the vehicle 1 stops.

In some cases, while the vehicle 1 is traveling (the vehicle speed is not zero), the ignition switch 36 is operated to be switched from the IG-ON state to the IG-OFF state and the power of EPB13 is turned on. In such a case, the control device 9 may decelerate the vehicle 1 by the regular brake 12 while keeping the power of the EPB 13 turned on, and operates the EPB 13 when the vehicle 1 stops. The shift control unit 45 may automatically switch the shift range from the D range, the R range, or the N range to the P range in response to the detection of complete stop of the vehicle. As a result, the first and second conditions can be met when the vehicle 1 stops.

In some cases, while the vehicle 1 is traveling at a vehicle speed equal to or less than a predetermined reference vehicle speed and the shift range is in the N range, the ignition switch 36 is operated to be switched from the IG-ON state to the IG-OFF state. In such a case, the shift control unit 45 keeps the shift range in the N range for a predetermined reference time, and as the predetermined reference time has elapsed, the shift control unit 45 automatically changes the shift range from the N range to the P range. As a result, the first condition can be met when the predetermined reference time has elapsed.

Effects of the Present Embodiment

In the present embodiment, the shift control unit 45 allows the shift device 6 to switch the shift range from the P range to the D range, the R range, or the N range upon the completion of the activation operation on the wheel-turning actuator 19. As a result, upon the completion of the activation operation on the wheel-turning actuator 19, the vehicle 1 is released from being fixed at the current position so that the vehicle 1 can move. This ensures that the wheel-turning actuator 19 is activated before the vehicle 1 starts traveling, thereby improving the reliability of steering while the vehicle 1 is traveling.

In particular, in the present embodiment, after the completion of the activation operation on the wheel-turning actuator 19, the control device performs a start operation on the internal combustion engine forming the driving device 3. As a result, in some cases, the voltage of the power-supply device 2 drops due to cranking, resulting in that the reaction actuator 16 and the wheel-turning actuator 19 are reset. In this case, the steering control unit 44 needs to perform restart operations on the reaction actuator 16 and the wheel-turning actuator 19. During the restart operations on the reaction actuator 16 and the wheel-turning actuator 19, the shift control unit 45 fixes the shift range to the P range again. This ensures that the wheel-turning actuator 19 is activated before the vehicle 1 starts traveling, thereby improving the reliability of steering while the vehicle 1 is traveling.

In addition, when determining that the power supply state of the vehicle 1 has been switched from the IG-OFF state to the IG-ON state, the steering control unit 44 starts the activation operation on the wheel-turning actuator 19. Thus, upon the change of the power supply state of the vehicle 1 from the IG-OFF state to the IN-ON state, the control device can quickly start activating the wheel-turning actuator 19. As a result, it is possible to shorten waiting time for an occupant of the vehicle before the completion of the operation for activating the wheel-turning actuator.

Moreover, when determining that the power supply state of vehicle 1 is the IG-OFF state and the vehicle 1 is fixed at the current position, the steering control unit 44 stops the wheel-turning actuator 19. Thus, the control device can stop the wheel-turning actuator 19 only after confirming that the vehicle 1 is at a complete stop. As a result, it is possible to further improve the reliability of steering while the vehicle is traveling.

When determining that at least one of the first condition and the second condition is met, the steering control unit 44 determines that the vehicle 1 is fixed at the current position. Thus, the control device can accurately determine whether or not the vehicle is fixed at the current position. As a result, it is possible to further improve the reliability of steering while the vehicle is traveling.

Furthermore, the steering control unit 44 switches the operation mode of the reaction actuator 16 between the travel mode for driving the vehicle 1 and the boarding/alighting assist mode for assisting a driver in getting on and out of the vehicle 1. Thus, it is possible to apply the reaction force to the steering member 15, not only while the vehicle 1 is traveling but also when a driver is getting on and out of the vehicle 1. As a result, the steering member 15 does not tend to move even when a driver touches the steering member 15 to get on and out of the vehicle, and thus it becomes easier for the driver to get on and out of the vehicle.

When the steering control unit 44 determines that a driver is getting on the vehicle 1, the steering control unit 44 activates the reaction actuator 16 in the boarding/alighting assist mode while stopping the wheel-turning actuator 19. Thus, it is possible to apply a reaction force to the steering member 15 when a driver is getting on the vehicle 1. As a result, the steering member 15 does not tend to move even when a driver touches the steering member 15 to get on the vehicle 1, and thus it becomes easier for the driver to get on the vehicle 1. In addition, as the control device activates the reaction actuator 16 while stopping the wheel-turning actuator 19, it is possible to reduce wasteful power consumption.

When determining that the power supply state of the vehicle 1 has been switched from the IG-OFF state to the IG-ON state, the steering control unit 44 switches the operation mode of the reaction actuator 16 from the boarding/alighting assist mode to the travel mode. Thus, in response to the change of the power supply state of the vehicle from the IG-OFF to the IG-ON state, the operation mode of the reaction actuator 16 can be quickly switched from the boarding/alighting assist mode to the travel mode. As a result, it is possible to shorten waiting time for an occupant of the vehicle before completion of the switch of the operation mode.

When determining that the power supply state of the vehicle 1 is the IG-OFF state and the vehicle 1 is fixed at the current position, the steering control unit 44 switches the operation mode of the reaction actuator 16 from the travel mode to the boarding/alighting assist mode. Thus, when the vehicle 1 stops traveling, the control device keeps the reaction actuator 16 operating so that the reaction actuator 16 continues to apply reaction forces to the steering member 15. As a result, the steering member 15 does not tend to move even when a driver touches the steering member 15 to get out of the vehicle, and thus it becomes easier for the driver to get out of the vehicle 1.

When the operation mode of the reaction actuator 16 is the boarding/alighting assist mode, the steering control unit 44 gradually changes the reaction force torque applied by the reaction actuator 16 to the steering member 15. Thus, it is possible to suppress a rapid change in the reaction force applied to the steering member 15, thereby reducing an uncomfortable feeling for a driver.

When determining that the predetermined time has not elapsed since the operation mode of the reaction actuator 16 was switched from the travel mode to the boarding/alighting assist mode, the steering control unit 44 stops the reaction actuator 16. As a result, as the reaction actuator 16 is prevented from continuously operating for a long time, it is possible to reduce wasteful power consumption.

Modifications to the Embodiment

In the present embodiment, the shift control unit 45 allows the shift device 6 to switch from the P range to the D range, the R range, or the N range when the start operation on the wheel-turning actuator 19 is completed. In other embodiments, the shift control unit 45 allows the shift device 6 to switch from the P range to the D range, the R range, or the N range a certain time after the start operation on the wheel-turning actuator 19 is completed.

In the present embodiment, the shift device 6 is used as a state switching device. In other embodiments, the EPB 13 may be used as a state switching device. In this case, a fixed state and a release state may be determined such that the EPB 13 is operating in the fixed state, while the EPB 13 is released from operating in the release state.

In the present embodiment, the shift device 6 is a shift-by-wire type shift device in which the shift member 33 is mechanically separated from the shift actuator 34. In other embodiments, the shift device 6 may be a shift device in which the shift member 33 is mechanically connected to the shift actuator 34.

In the present embodiment, the EPB13 (electric parking brake) is used as a parking brake. In other embodiments, a mechanical parking brake may be used as a parking brake.

Specific embodiments of the present invention are described herein for illustrative purposes. However, the present invention is not limited to those specific embodiments, and various changes may be made for elements of the embodiments without departing from the scope of the present invention.

Glossary 1 vehicle
6 shift device (state switching device)
9 control device
13 EPB (electric parking brake)
15 steering member
16 reaction actuator
19 wheel-turning actuator
30 front wheel (or any other wheel)
41 vehicle speed sensor

The invention claimed is:

1. A vehicle, comprising:
a steering member for receiving steering operations;
a wheel-turning actuator mechanically separated from the steering member and configured to turn wheels for change in a moving direction of the vehicle;
a state switching device for switching between a fixed state in which the vehicle is fixed at a current position and a release state in which the vehicle is released from being fixed at the current position; and
a control device for controlling the wheel-turning actuator and the state switching device,
wherein the control device permits the state switching device to switch from the fixed state to the release state only on or after completion of an operation for activating the wheel-turning actuator,
wherein the vehicle further comprises a reaction actuator for applying a reaction force to the steering member, the reaction force being responsive to a steering operation received by the steering member, and
wherein the control device switches an operation mode of the reaction actuator between a travel mode for driving the vehicle and a boarding/alighting assist mode for assisting a driver in getting on and out of the vehicle by applying the reaction force to the steering member such that movement of the steering member is reduced when the driver touches and applies a force to the steering member.

2. The vehicle according to claim 1, wherein the vehicle has a power supply state which can be switched between a first power supply state in which the vehicle is prevented from traveling and a second power supply state in which the vehicle is permitted to travel, and
wherein the control device is configured such that, when the power supply state of the vehicle is the first power supply state and both the wheel-turning actuator and the reaction actuator stop operating, the control device determines whether or not a driver is getting on the vehicle, and when determining that the driver is getting on the vehicle, the control device activates the reaction actuator so that the reaction actuator operates in the boarding/alighting assist mode, while stopping the wheel-turning actuator.

3. The vehicle according to claim 2, wherein the control device is configured such that, when the power supply state of the vehicle is the first power supply state and the reaction actuator is operating in the boarding/alighting assist mode, the control device determines whether or not the power supply state of the vehicle has been switched from the first power supply state to the second power supply state, and that, when determining that the power supply state of the vehicle has been switched from the first power supply state to the second power supply state, the control device switches the operation mode of the reaction actuator from the boarding/alighting assist mode to the travel mode.

4. The vehicle according to claim 1, wherein the vehicle has a power supply state which can be switched between a first power supply state in which the vehicle is prevented from traveling and a second power supply state in which the vehicle is permitted to travel, and
wherein the control device is configured such that, when the operation mode of the reaction actuator is the travel mode, the control device determines whether or not the power supply state of the vehicle is the first power supply state and the vehicle is fixed at the current position, and that, when determining that the power supply state of the vehicle is the first power supply state and the vehicle is fixed at the current position, the control device switches the operation mode of the reaction actuator from the travel mode to the boarding/alighting assist mode.

5. The vehicle according to claim 1, wherein, when the operation mode of the reaction actuator is the boarding/alighting assist mode, the control device gradually changes the reaction force applied by the reaction actuator to the steering member, to thereby prevent a rapid change in the reaction force applied to the driver's hand via the steering member.

6. The vehicle according to claim 1, wherein, when a predetermined time has elapsed since the operation mode of the reaction actuator became the boarding/alighting assist mode, the control device stops the reaction actuator.

7. A vehicle, comprising:
a steering member for receiving steering operations;
a wheel-turning actuator mechanically separated from the steering member and configured to turn wheels for change in a moving direction of the vehicle;
a state switching device for switching between a fixed state in which the vehicle is fixed at a current position and a release state in which the vehicle is released from being fixed at the current position; and
a control device for controlling the wheel-turning actuator and the state switching device,
wherein the control device permits the state switching device to switch from the fixed state to the release state only on or after completion of an operation for activating the wheel-turning actuator,
wherein the vehicle has a power supply state which can be switched between a first power supply state in which the vehicle is prevented from traveling and a second power supply state in which the vehicle is permitted to travel, and
wherein the control device is configured such that, when the power supply state of the vehicle is the first power supply state and the wheel-turning actuator stops operating, the control device determines whether or not the power supply state of the vehicle has switched from the first power supply state to the second power supply state, and that, when determining that the power supply state of the vehicle has switched from the first power supply state to the second power supply state, the control device starts the operation for activating the wheel-turning actuator.

8. A vehicle, comprising:
a steering member for receiving steering operations;
a wheel-turning actuator mechanically separated from the steering member and configured to turn wheels for change in a moving direction of the vehicle;
a state switching device for switching between a fixed state in which the vehicle is fixed at a current position and a release state in which the vehicle is released from being fixed at the current position; and
a control device for controlling the wheel-turning actuator and the state switching device,
wherein the control device permits the state switching device to switch from the fixed state to the release state only on or after completion of an operation for activating the wheel-turning actuator,
wherein the vehicle has a power supply state which can be switched between a first power supply state in which the vehicle is prevented from traveling and a second power supply state in which the vehicle is permitted to travel, and wherein the control device is configured such that, when the wheel-turning actuator is operating, the control device determines whether or not the power supply state of the vehicle is the first power supply state and the vehicle is fixed at the current position, and that, when determining that the power supply state of the vehicle is the first power supply state and the vehicle is fixed at the current position, the control device stops the wheel-turning actuator.

9. The vehicle according to claim 8, further comprising:

a vehicle speed sensor for detecting a vehicle speed of the vehicle; and an electric parking brake for fixing the vehicle at the current position, wherein the state switching device is a shift device configured to switch a shift range between a fixed range for fixing the vehicle at the current position and a release range for releasing the vehicle from being fixed at the current position, and wherein the control device determines that the vehicle is fixed at the current position when at least one of two conditions is met, the two conditions consisting of a first condition in which the vehicle speed detected by the vehicle speed sensor is zero and the shift range is the fixed range, and a second condition in which the vehicle speed detected by the vehicle speed sensor is zero and the electric parking brake is operating.

* * * * *